UNITED STATES PATENT OFFICE.

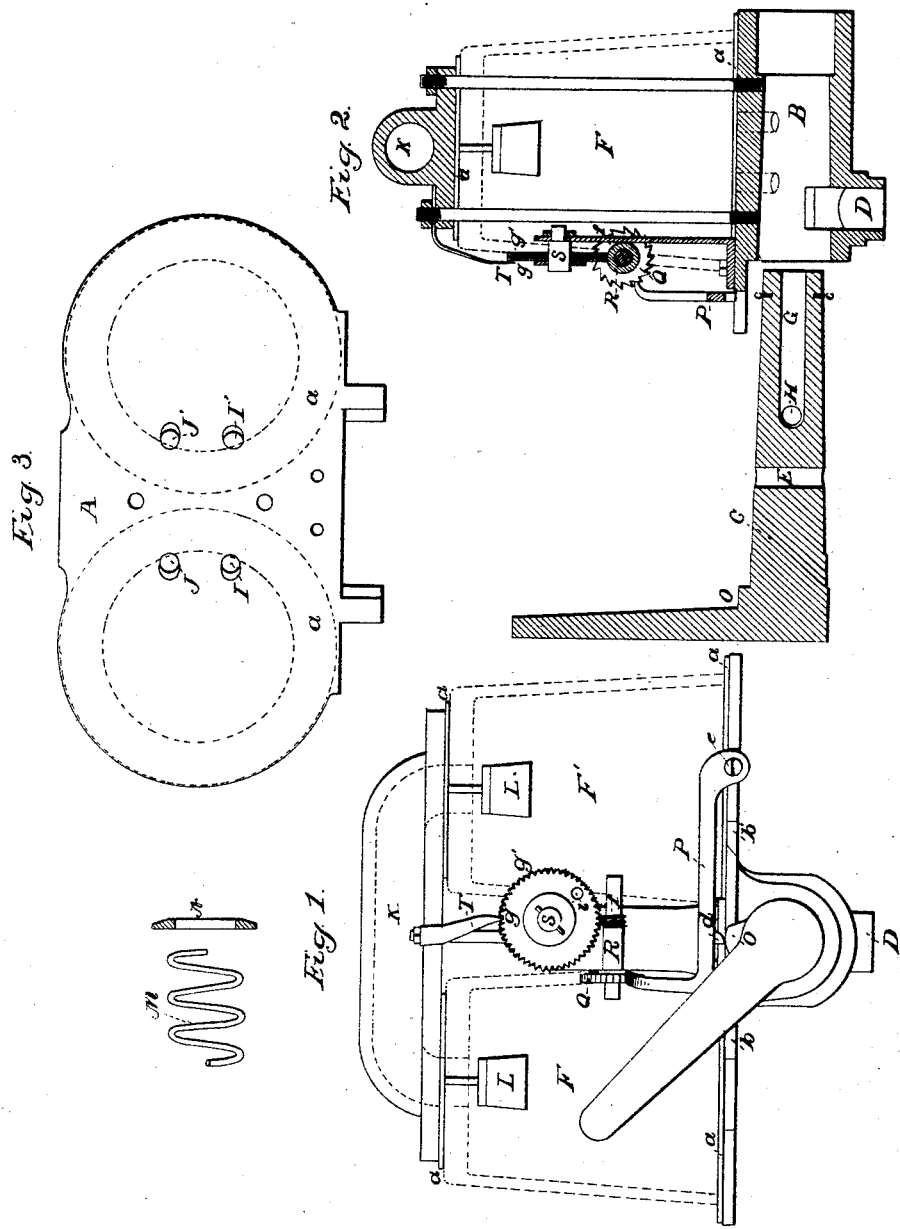

JOSEPH D. ELLIOT, OF LEICESTER, MASSACHUSETTS.

WATER-METER.

Specification of Letters Patent No. 11,806, dated October 17, 1854.

*To all whom it may concern:*

Be it known that I, JOSEPH D. ELLIOT, of Leicester, in the county of Worcester and State of Massachusetts, have invented certain new and useful Improvements in Water-Meters; and I do hereby declare the following to be a full, clear, and exact description of the same, reference being had to the accompanying drawings, making a part of thereof, in which—

Figure 1 represents a view or front elevation. Fig. 2, represents a vertical transverse section through the machine, with the plug and its fastenings separated from it, and Fig. 3, represents a top view of the plate or water table upon which the apparatus may be arranged.

Similar letters in the several figures denote like parts.

The nature of my invention consists in combining with a two way cock, a measuring apparatus and register, so that by simply turning the cock a measured quantity will be let out, and at the same time a measured quantity let in to the apparatus, which in turn may be drawn off by turning the cock in an opposite direction, and each measured quantity thus drawn indicated correctly, it being received and drawn under an uniform head.

Of my invention it might be called a hand meter, or a measuring cock or faucet, as it only measures while the cock is open to allow the water to be drawn. And to enable others skilled in the art to make and use my invention I will proceed to describe the same with reference to the drawings.

A water table or plate A, may be suitably arranged in any convenient place for drawing water, and underneath the same in a socket or tube B, is fitted a plug C, which has a double inlet and exit for the water as follows: The pipe which connects with main is attached to the apparatus at D, and through the plug C, is a hole E, which alternately communicates with the two measuring chambers or reservoirs F, F', (shown in dotted red lines). These chambers may be of glass or any other suitable material, and should be gaged to some specific quantity especially if made of metal. But if made of glass a marked scale may be used which can be seen, or the height of the water therein may be constantly in view, so as to draw off fractional quantities, or like the metal ones they may hold a measured quantity. These reservoirs are placed upon the water table and should have vulcanized rubber packing rings *a* under them, to make a tight water joint.

The plug C, besides the way E through it, has its center G bored out back to an opening H, passing through the plug at right angles to that E. Now, the way E communicates upon being turned about a quarter of a revolution with the two openings I, I', through the water table (seen in Fig. 3) alternately, as it is turned in one or the other direction; and the way H, in like manner, and by the same turning of the plug or faucet, communicates alternately with the openings J, J', in the water table. When the handle of the plug or faucet is turned as seen in Fig. 1, (its extent of motion being regulated by the stops *b*, *b'*, on each side) the way E connects the pipe D, with the opening I, and allows the water to flow into and fill the chamber F.

The chambers F, F', have an air passage K, leading from the top of one to the top of the other, and each end of this air passage is provided with a float valve L, so that when the water rises up to the top, or at the requisite height in either chamber the floats will rise into seats and close the air passage. As before described in filling the chamber F—the air is driven over in allowing the water to enter into the other chamber F'. While the communication is open between D and I, there is also a communication open from J', through H and G, to the exit, for emptying the chamber F', and as it empties, the air is forced over from F into it until F, closes by the float valve. Now turn the handle against the stop *b'*, and the inlet I, and exit J', are closed, and the other inlet I', and exit J, are opened, and the chamber F' fills while vat F, is emptying—and thus by alternately shifting the handle of the cock or plug C, one chamber fills while the other empties, the air in said chambers passing from one chamber to the other.

M is a helical spring which passes around the end of the plug C, when it is in place, and N a washer, the whole being held in place by pins passing into the plug at *c c* behind the washer.

A cam O, is arranged on the root of the plug, which strikes a projection *d*, on a lever pawl P, pivoted at e, and raises up said lever pawl at every turning of said plug. The pawl works in a ratchet wheel Q, and every time it is raised up gives the ratchet a portion of a revolution. On the shaft R of this ratchet wheel is the portion of a thread of a screw f, which takes into teeth on the periphery of two registering wheels g, g', arranged on the same shaft S, this being for the purpose of registering the quantity measured and drawn through the cock. These two dial wheels g, g', (supposing the chambers F, F', each to contain one gallon) will register 2500 or 2600 gallons before the register will be full. The pawl only operates the ratchet when one of the chambers (F) is emptying, so that there being 16 teeth in the ratchet, and each one representing two gallons. When it has made one entire revolution, the cylinders will have been filled and emptied 32 times. The front dial g, has 50 teeth in its periphery, and the rear one g', has fifty-one, now as both wheels are worked from the same screw or worm f, one revolution of the worm, turns each dial one tooth, which will be one barrel or 32 gallons, and this will be registered or indicated by the pointer or finger T over the front dial. When the worm shaft has made 50 revolutions, the front dial g will have turned once around and the rear dial will have turned once around minus one tooth, it having one tooth more than the front dial. By looking through the hole i, in the front dial, it will be perceived that the rear dial has fallen back one tooth or from "0" to figure "1," which is the register of the 50 barrels that the front dial has registered or counted. On another revolution of the front dial, it will be perceived that it has fallen back to figure "2" which is the register of the second 50 barrels, and so on.

The cock itself has nothing to do with the measurement, as it is but the medium through which the water is let in to be measured, and then drawn off again.

Instead of working the dials g, g', by the ratchet and worm they may be worked by gear wheels, although I believe the above described plan to be more simple.

The shifting of the air of one cylinder into the other to displace the water, or to enable the water to be discharged, makes uniformity in receiving and discharging the contents of the cylinders, that is to say, the water is received and discharged under the same head, which admits of correct measurement, and such would not be the case, if the air had to be compressed. As I use it there is a perfect compensation between the inlet and exit of the water, which acts as a governor or regulator.

The cock or plug, as before stated, is but the medium through which the water is let in and drawn off, and instead of a turning plug or socket, it may be a sliding one, or made in any other manner, which will admit of the ways necessary to fill one chamber while it draws off the other one, and vice versa, and the meter itself may be varied in form and proportions without changing the general principle or characteristic of the machine.

Having thus fully described the nature of my invention what I claim therein as new, and desire to secure by Letters Patent is—

1. The combination of the measuring chambers or reservoirs with the cock, substantially in the manner and for the purpose described, that is to say so that a measured quantity of water shall be let in and drawn off at each and every turning of the cock.

2. I also claim in combination with the cock and reservoirs, the register g g', made and operated substantially as described.

3. I also claim in combination with the reservoirs F F', the air passage K, with its float or equivalent valves, for the purpose of forming a governor to receive and discharge the water under the same head, as set forth.

JOSEPH D. ELLIOT.

Witnesses:
 WM. F. SLOCUM,
 ALBERT A. SMITH.